US009712503B1

(12) United States Patent
Ahmed et al.

(10) Patent No.: US 9,712,503 B1
(45) Date of Patent: Jul. 18, 2017

(54) COMPUTING INSTANCE MIGRATION

(71) Applicant: Amazon Technologies, Inc., Seattle, WA (US)

(72) Inventors: Khaja Ehteshamuddin Ahmed, Bellevue, WA (US); Diwakar Gupta, Seattle, WA (US); Matthew Shawn Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 14/666,225

(22) Filed: Mar. 23, 2015

(51) Int. Cl.
*H04L 29/06* (2006.01)
(52) U.S. Cl.
CPC ........ *H04L 63/0435* (2013.01); *H04L 63/062* (2013.01); *H04L 63/0823* (2013.01); *H04L 63/0876* (2013.01)
(58) Field of Classification Search
None
See application file for complete search history.

(56) References Cited

U.S. PATENT DOCUMENTS

| 2011/0291803 A1* | 12/2011 | Bajic | G08B 13/2462 340/10.1 |
|---|---|---|---|
| 2014/0208111 A1 | 7/2014 | Brandwine et al. | |
| 2015/0319160 A1* | 11/2015 | Ferguson | H04L 9/3247 726/10 |

OTHER PUBLICATIONS

Authors: Charlie Kaufman; "Network Security Private Communication in a Public World"; Publisher: Prentice Hall; ISBN-13: 978-0-13-046019-6; Date: Apr. 22, 2002; Chapter 11, 16 pages.*

* cited by examiner

*Primary Examiner* — Hadi Armouche
*Assistant Examiner* — Andrew Steinle
(74) *Attorney, Agent, or Firm* — Thorpe North & Western, LLP

(57) ABSTRACT

Technology for migration of a computing instance is provided. In one example, a method may include receiving instructions to initiate migration of the computing instance from a first host to a second host. A first message for sending to the first host may be generated which includes instructions to send data representing the computing instance to the second host. The first message may further include encryption information for use in deriving at least one key for encrypting communications to the second host from the first host. A second message for sending to the second host may be generated which includes instructions to receive the data representing the computing instance from the first host. The second message may further include information for use in deriving at least one key for decrypting communications from the first host. The first and second messages may be sent to the respective first and second hosts.

20 Claims, 8 Drawing Sheets

COMPUTING INSTANCE MIGRATION

BACKGROUND

Applications and computing services are often made available over the Internet or other computer networks. Content providers, application providers, and/or computing service providers often utilize remote computing services to provide access to electronic resources, such as web services. Electronic resources may include processing services, memory services, storage services, networking services and generally any computing services supported by a hardware system substrate that used in a computing environment. Often the software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

To facilitate increased utilization of network accessible computing resources provided via a data center, virtualization technologies can allow a single physical computing machine to host one or more instances of virtual machines (e.g., computing instances) that appear and operate as independent machines to a connected computer user. With virtualization, the single physical computing device can create, maintain or shut down virtual machines in a dynamic manner. In turn, users can request computer resources from a data center and be provided with varying numbers of virtual machine resources on an "as needed" basis or at least on an "as requested" basis.

As the scale and scope of data centers has increased, the task of provisioning, administering and monitoring the physical and virtual computing resources of the data center has become increasingly complicated. Virtual machines (e.g., computing instances) may be migrated from one host to another for: maintenance, providing hardware which better supports the virtual machine or for other reasons. In a process known as live migration of virtual machines, a virtual machine's runtime state may be moved to a different physical host without significant disruption or downtime. This enables efficient and flexible management in a virtual infrastructure for dynamic optimization of virtual machine performance.

DETAILED DESCRIPTION

Figure 1:
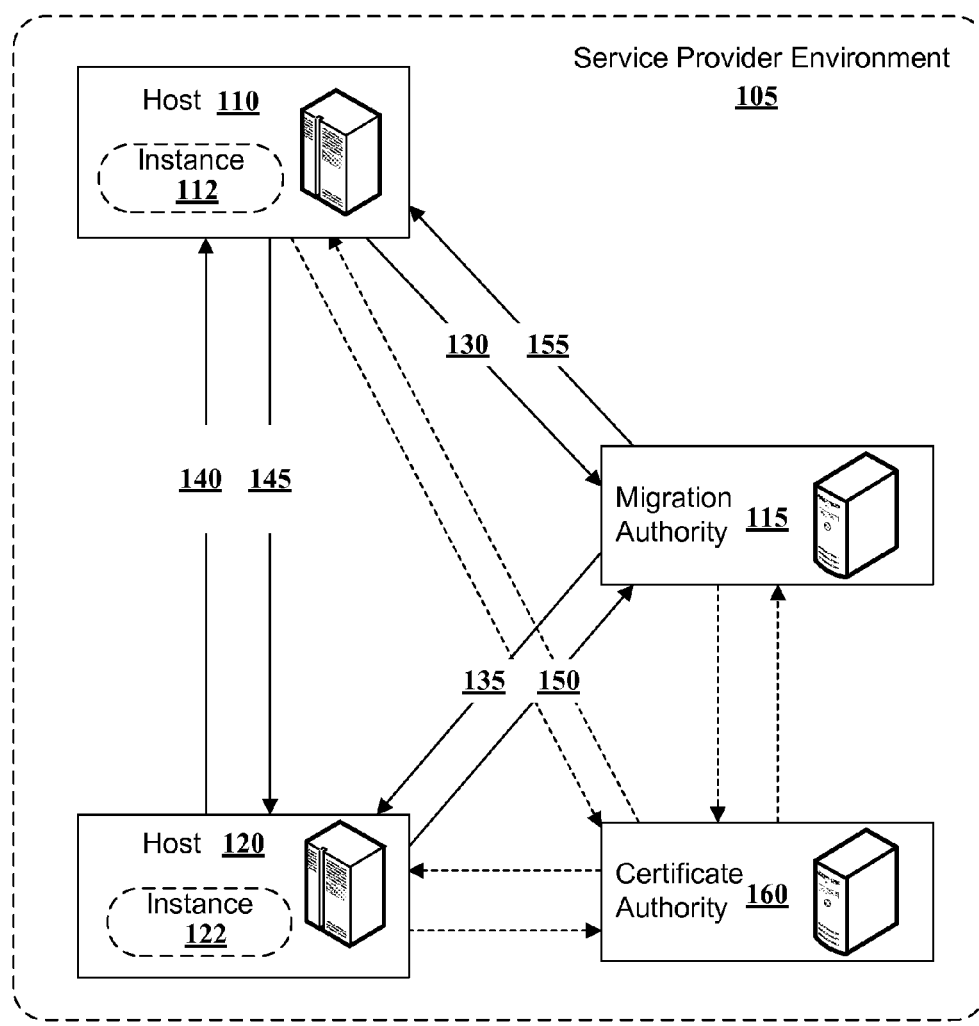
FIGS. 1-2 are schematic overviews of computing instance migration systems for migrating computing instances between hosts in accordance with examples of the present technology.

Technology for migration of a computing instance is provided. A computing instance may be, for example, a virtual machine configured to execute predefined software on a virtual machine manager and hardware substrate, and the computing instance may have computing resources available for executing the software, including resource combinations of CPU (Central Processing Unit), memory, storage, and networking capacity. Migration of the computing instance may involve transferring or copying memory, storage, network connectivity, state information, computing environment attributes, metadata, or the like of the computing instance from an original host machine to a destination host machine. Migration of the computing instance may be a transfer or copy of data representing the computing instance, or in other words the migration may be a compute node's attributes and associated data, or more simply defined, a node.

In one example, a method may include receiving instructions to initiate migration of the computing instance from a first host to a second host. A first message to be sent to the first host may be generated, and the message may include instructions to send data representing the computing instance to the second host. The first message may further include encryption information for use in encrypting communications from the first host to the second host. A second message to be sent to the second host may be generated, and the message may include instructions to receive the data representing the computing instance from the first host. The second message may further include information for use in decrypting communications from the first host. The first and second messages may be sent to the respective first and second hosts. The first and second messages may be generated by and sent from a migration authority configured to authorize and orchestrate the migration of the computing instance between hosts.

In another example, a method for migration of a computing instance may include receiving instructions at a migration authority to initiate migration of the computing instance from a first host to a second host. The instructions may include an identification of the first and second hosts. A first message or payload may be generated at the migration authority for transmission to the first host. The first message may include instructions for the first host to send data representing the computing instance to the second host, and the message may further include a public key of the second host for decrypting communications from the second host encrypted by a private key of the second host. A second message or payload may be generated at the migration authority for transmission to the second host. The second message may include instructions to receive the data representing the computing instance from the first host and to instantiate the data representing the computing instance as an executing computing instance. The second message may further include a public key of the first host for decrypting communications from the first host encrypted by a private key of the first host. The method may include signing the first and second messages with a migration authority public certificate for verification by the first and second hosts, and sending the first and second messages to the respective first and second hosts.

FIG. 1 illustrates an example system for migrating computing instances between hosts. The computing instances may be virtualized computing instances. For example, FIG. 1 illustrates a service provider environment 105, such as a VPC (Virtual Private Cloud), in a virtual computing system for example. The service provider environment 105 may include any number of computing instances 112, 122 which may be hosted on physical hosts 110, 120 or host computing resources (e.g., hardware).

Migration of a computing instance 112, 122 on a host 110, 120 or "droplet" involves moving the computing instance 112, 122 to a different host 110, 120 or droplet. Migration may involve moving: instance memory, network interfaces, storage interfaces (e.g., block storage interfaces), state information, computing environment attributes, metadata, and other computing instance components. A live migration may refer to a migration with minimal or insignificant downtime, which has minimal impact on customers relying on the computing instance. For example, a live migration may be a migration with downtime on the order of a couple of seconds, hundreds of milliseconds, or less than one hundred milliseconds. A migrated computing instance on a new host (e.g., a machine or physical, computing hardware) may access the same separate storage service, networking service, or other computing resources as were used or accessed prior to the migration.

Migration of a computing instance 112, 122 is preferably a secure process that is not accessible by other parties or repeatable by others. Additionally, the secure process preferably ensures that any migration requests are authorized to prevent accidental, unauthorized or malicious transfers.

The present technology provides a multiple party migration system involving at least two hosts 110, 120 (i.e., a sending host and a receiving host) for migrating a computing instance 112 or 122 and a trusted, third authoritative service (e.g., migration authority 115), which may optionally be a third-party service. Migration may be performed using encryption for communications between the hosts and for authenticated communication between the hosts and the migration authority. The present technology may enable live migration involving a three-way handshake with the trusted migration authority 115. The migration authority 115 may be used to validate any transfers or migrations, as well as to generate key material used in encrypting the communications between the hosts 110, 120.

According to the present technology, a host 110, 120 may not be enabled to initiate a migration without instruction to do so from the trusted migration authority 115. Also, a host 110, 120 may not be enabled to receive a migration of a computing instance 112, 122 without instruction to do so from the trusted migration authority 115. The migration authority 115 may receive a request to migrate a computing instance 112, 122. For example, the migration authority 115 may receive the request from an administrator upon provision of the appropriate administrator credentials.

The migration authority 115 may utilize encryption for encrypting messages to the hosts 110, 120, and may further instruct the hosts 110, 120 to utilize encryption for communicating between one another. The hosts 110, 120 may communicate with one another and/or with the migration authority 115 using Identity Access Management (IAM) technology. IAM technology may be used to initiate, capture, record and manage host identities and related access permissions in an automated fashion. This ensures that access privileges are granted according to one interpretation of policy and the hosts or services are properly authenticated, authorized and audited when communicating to migrate a computing instance. The communications may be encrypted. The encryption may include, for example, public key cryptography. In public key cryptography, a public key may be published that may be used by others to encrypt electronic communication contents and may be used to verify signatures performed by the corresponding private key. By keeping a secret, private key corresponding to a public key, electronic communications encrypted with the public key may be decrypted and signatures applied can be verified with the public key. Electronic communications may be digitally encrypted using the public key.

In one example, the migration authority 115 may identify a sending and a receiving host for the migration and may access (or already have) the public keys for each of the hosts 110, 120. The migration authority 115 may send 135, 155 the public key of the receiving host to the sending host with instructions to migrate the computing instance to the receiving host. The migration authority 115 may send the public key of the sending host to the receiving host along with an instruction to receive the migration from the sending host. The hosts 110, 120 may optionally periodically generate new key pairs which are certified by a certificate authority 160. The certificate authority 160 may be in communication with each of the hosts 110, 120, as well as the migration authority 115. The certificate authority 160 may be an existing certificate authority. In short, a certificate authority or certification authority may be an entity that issues digital certificates. A digital certificate certifies the ownership of a public key by the named subject of the certificate. This allows others (relying parties) to rely upon signatures or on assertions made using the private key that corresponds to the certified public key. In this model of trust relationships, a certificate authority is a trusted third party—trusted both by the subject (owner) of the certificate and by the party relying upon the certificate. The certificate authority may be a feature of a public-key infrastructure (PKI) schemes. Although illustrated within the service provider environment 105, the certificate authority 160 may alternatively reside outside of the server provider environment 105.

The public key certificates may be retrieved by the migration authority 115 from the certificate authority 160 for use in migration between hosts 110, 120. Once the migration authority 115 has instructed the hosts 110, 120 to perform a migration and provided encryption information for encrypting the migration, the hosts 110, 120 may establish or utilize direct communication 140, 145 to perform the migration. For example, the computing instance 112 may be hosted by host 110 and instructions may be received at host 110 to migrate the computing instance 112 to host 120. Host 120 may receive the computing instance as a migrated computing instance illustrated as 122.

In one example, the migration authority 115 may generate key seeds for use by the hosts 110, 120 in generating symmetric keys for performing the migration, as will be described later. The migration authority 115 may send a key seed to each of the hosts 110, 120 and a corresponding key seed to the other of the hosts. The hosts 110, 120 create session keys based on the key seeds. The session keys derived by hosts 110, 120 will be identical if the key derivation process and the seed provided by the migration authority 115 to each host is identical. A first host may use the public key of the second host to encrypt communications to the second host. The second host may use the public key of the first host to encrypt communications to the first host. Without the corresponding key, another host or entity would be unable to decrypt the encrypted communications. Use of encryption key seeds generated for use with a specific migration activity may limit the ability of other parties to intercept and decrypt messages using old or previously used keys. Thus, the present technology may reduce the potential for fraudulent or incorrect migrations of computing instances.

The communication of the key seeds to the first and second hosts may also be encrypted. For example, the migration authority may sign or encrypt communications using one or more public keys corresponding to one or more private keys known to the hosts. In one example, the hosts may access a public key certificate (also known as a digital certificate or identity certificate) of the migration authority to verify ownership of a key used by the migration authority. The certificate includes information about the key, information about its owner's identity, and the digital signature of an entity that has verified the certificate's contents are correct. If the signature is valid, and the host examining the certificate trusts the signer (e.g., the certification authority), then the host knows that the key may be trusted and used to communicate with its migration authority.

Communications between the hosts and the migration authority may be encrypted. As a result, a host may be restricted from initiating a migration of a computing instance to another host because the receiving host would be unable to decrypt computing instance data without the appropriate key(s) from the migration authority. If a key was not received from the migration authority or is not needed to decrypt the migration request, then the second host may be configured to reject the migration. The migration authority may thus dictate which host is authorized to convey a computing instance to which other host. As is described herein, the keys used for encrypting communications may be updated or replaced periodically or after each use to reduce the likelihood of attempts by unauthorized third parties to use the keys to migrate computing instances. Keys which are not reused or do not persist may be considered ephemeral keys.

Communications between hosts 110, 120 or between the hosts 110, 120 and the migration authority 115 may be encrypted using Transport Layer Security (TLS), Secure Sockets Layer (SSL) or the like. The migration authority may initiate communications between hosts. A TLS session may only be initiated between these hosts. The TLS session may use certificates and hence asymmetric cryptography to authenticate the counterparty (e.g., the other host) with whom communications are made and to exchange a symmetric key. This symmetric key may then be used to encrypt data flowing between the hosts. This allows for data/message confidentiality, message authentication codes for message integrity and, as a by-product, message authentication. Without the appropriate certificates or keys, such communications will fail. The present technology may use a direct trust model of public key infrastructure (PKI) where hosts are allowed to trust only specifically identified certificates.

Figure 2:
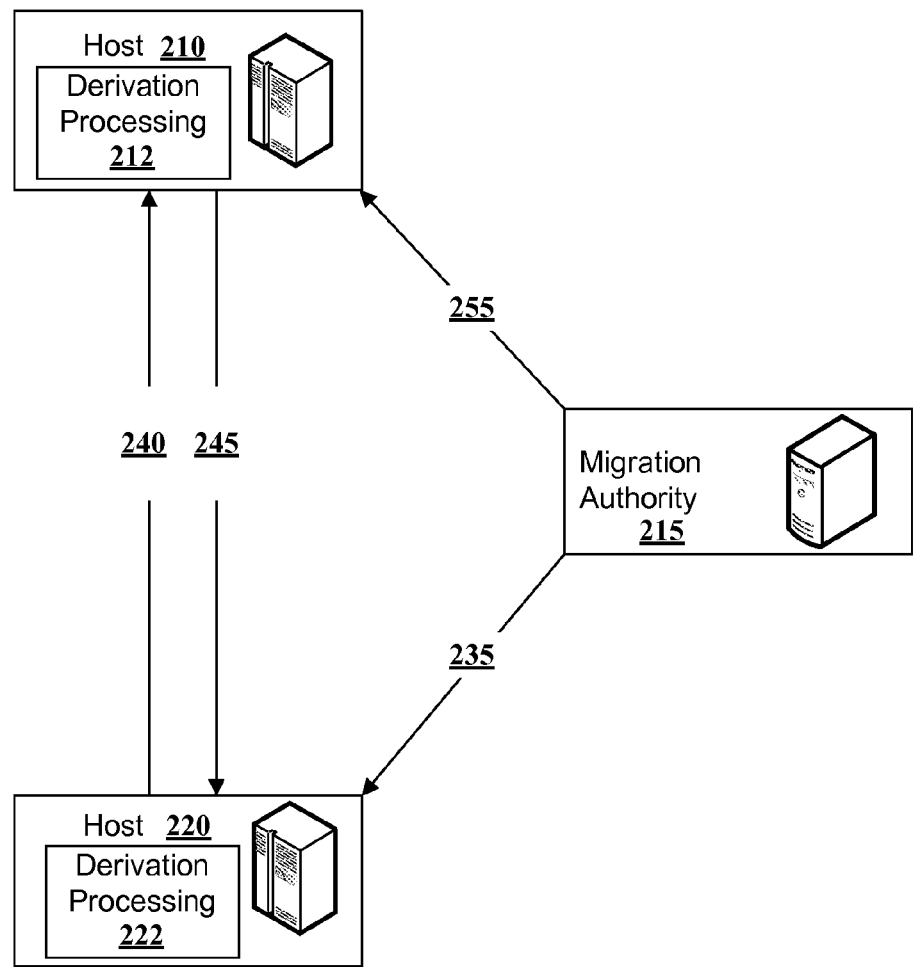

Reference will now be made to FIG. 2. FIG. 2 illustrates a system for migrating a computing instance between hosts 210, 220 at 240, 245, using a secure mechanism for facilitating the migration. For example, an entire session between hosts 210, 220 may be encrypted at a transport layer level, such as by using message level security or DNS (Domain Name Service) transport level security. In other words, the migration may involve a per message level of encryption or a per block of memory level of encryption to encrypt the communication. This transport layer level encryption may optionally be in addition to the higher level encryption such that multiple keys are required to access an individual message or block of memory.

Use of transport layer encryption may involve use of a plurality of encryption keys to encrypt or decrypt messages, memory blocks or the like. For example, each successive message sent may be encrypted with a different key and the receiving host may be enabled to decrypt the successive messages using appropriate keys. In other words, the message level security may use a key stream rather than a single encryption key to encrypt a stream of messages.

The keys in the key stream may be derived 212, 222 independently at each of the hosts 210, 220. The keys may be derived at derivation processing 212, 222 in a manner that involves the migration authority 215. For example, the migration authority 215 may independently send 235, 255 encryption information, such as a seed to generate encryption keys, to each of the hosts 210, 220 involved in the migration. Each host may perform a key derivation function that derives a sequence or series of keys at derivation processing 212, 222 for use in encrypting each successive message. The key derivation function may derive the sequence of keys from the seed. Each of the hosts may compute the key derivation function independently of one another, and each of the hosts may use the same algorithm known by the hosts (e.g., prior to the migration request) to derive the appropriate keys in the appropriate order for sending or receiving messages. The migration may succeed when both hosts use the same, correct key derivation function which derives the keys from the same encryption information or material (e.g., a seed) received from the migration authority. Otherwise, the migration will fail. While this example describes use of a seed to derive a sequential string of keys, an alternative example involves using the seed to derive a one or two sets of keys for use by the hosts in sending or receiving computing instance data to complete the migration.

While FIG. 2 illustrates the derivation processing 212, 222 at the hosts 210, 220, the derivation processing 212, 222 may be performed on an offload card, which may be a general purpose computer, including a processor, on a network card configured to execute specified operations. For example, the derivation processing 212, 222 may be code running in a hypervisor (e.g., a DOMO) or on a co-processor which may be on a peripheral device, such as a dongle, card or the like. The peripheral device may enable off-loading of the derivation processing 212, 222 from a main processor of the hosts 210, 220.

In practice, a host 210 or 220 may receive a communication from the migration authority 215 which is encrypted by the migration authority 215 using a public key of the host 210 or 220. The host 210 or 220 may use a corresponding private key to decrypt the communication and retrieve migration instructions as well as the encryption information. For example, the encryption information may include a hash to be used in the key derivation function to derive the sequence of keys. The actual key derivation function selected to be used by the hosts may be any of a variety of suitable existing or custom key derivation functions. An example key derivation function that may be used is RFC (Request for Comments) 5869 as listed by the Internet Engineering Task Force (IETF), which is incorporated herein by reference. The hosts performing the key derivation, in addition to using a same key derivation function may track packets, memory blocks or the like to identify which key in a sequence of keys to use to encrypt or decrypt any particular packet or memory block. When the hosts 210, 220 are synchronized or performing the encryption/decryption in a synchronized manner, a receiving host may recognize, for example, that the message received is message #3 in a message sequence and that key #3 in a key sequence may be used to decrypt the message. The receiving host may then use key #4 for message #4 and so forth. Performing the encryption/decryption in synchronization also reduces the possibility of replay attacks where a valid data transmission is maliciously or fraudulently repeated or delayed.

The encryption information may be any particular information. By using information specific to a transaction, a chance that a migration is sent to a wrong host may be reduced. Specifically, re-use of sensitive data, such as encryption information (e.g., a hash), may increase a likelihood of error or other issues. For example, re-use of a key may result in a transaction being more susceptible to attack. By not reusing keys, likelihood of a key being successfully attacked may be reduced.

The encryption information may include a nonce. The nonce may be idempotent and may be generated once. For example, the nonce may be a random number, such as a 160 bit integer. The nonce may be concatenated with a hash of a host address or host name as well as with a time stamp obtained from a clock or a clock service. The migration authority may send this concatenation as encryption information (e.g., a seed or a nonce) to the hosts. The concatenation may be sent as a payload or message independently or separately to the hosts, both signed or encrypted. The migration authority 215 may sign the message using the migration authority's private key. The migration authority 215 may encrypt the message using each host's public key. The hosts 210, 220 may then use their respective private keys to decrypt the message and a migration authority public key to verify the certificate of the migration authority 215.

In one example of the present technology, rather than sending public keys to the hosts 210, 220 involved in the migration, the migration authority 215 may send a key derivation function to the hosts. The hosts 210, 220 may use host certificates to calculate a key to use in encrypting or decrypting a message, where the key may be an individual key or a sequence of keys. For example, the host 210 may use a certificate of the other host 220, which may include information such as a public key for the host 220, certificate issuer information, certificate use instructions or any other type of metadata. Host 210 may use the certificate of other host 220 in the key derivation function to derive keys for communicating with that other host 220. The key derivation function in this example may be generated in such a way that use of an incorrect certificate in the function will result in an inability to encrypt or decrypt a message and the migration will fail. If migration instructions are sent from the migration authority to an incorrect host or if an incorrect host attempts to initiate or receive a migration, the migration will not be able to be completed because the incorrect host will not have the appropriate certificate to derive the correct keys. Also, if a host attempted to send to or receive from an incorrect host, the lack of the correct certificate for deriving the keys would also cause the migration to fail.

In one example, the migration authority 215 may use a certificate public key of the hosts to be involved in the migration to generate a transaction-specific key derivation function. If the key derivation function is attempted using a private key of the host, the key derivation function will succeed if performed by the intended host and the sequence of keys may be derived. If the key derivation function is attempted using a private key of an unintended host, the key derivation function will fail because the host does not have the correct certificate private key.

In the example above, the migration authority 215 refrains from sending any sensitive information to any host. Rather, the migration authority relies on the hosts to have the sensitive, private information (i.e., private key(s)) to derive encryption keys for use in communicating with the other host to perform the migration.

In one example, the key derivation function may use a time stamp, either from the instructions from the migration authority, or a time stamp of when the key derivation function is performed. A key derivation function may derive keys using a concatenation of a time stamp with a nonce and/or one or more identifiers, such as of the destination host IP address and/or other migration authority provided identifiers. Some example identifiers in addition to an IP address may include a hash of a public key certificate, a hash of a public key, a fully qualified domain name (FQDN), or the like.

As used herein "virtual computing" may refer to the use of computing services (hardware and/or software) which may be available at a remote location from the users of the computing services and the virtual computing services may be accessible over a network, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing services, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing services for executing software or computing instances, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may track metrics, supply a proxy server, etc. Some application packages offer focused computing functions by focusing on a single task, such as numerical analysis. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware, hardware processors and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, key-value data stores, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The systems of FIGS. 1-2 may be implemented across one or more computing devices, which may be connected via a network. For example, the computing systems, computing devices or computing resources may host various engines and/or modules and such modules may be executable by a processor of the local device. The computing systems may be implemented as a plurality of computing nodes, each of which comprises at least one processor and a memory, where the computing nodes are configured to collectively implement the modules, data stores and so forth.

A computing system may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 3:
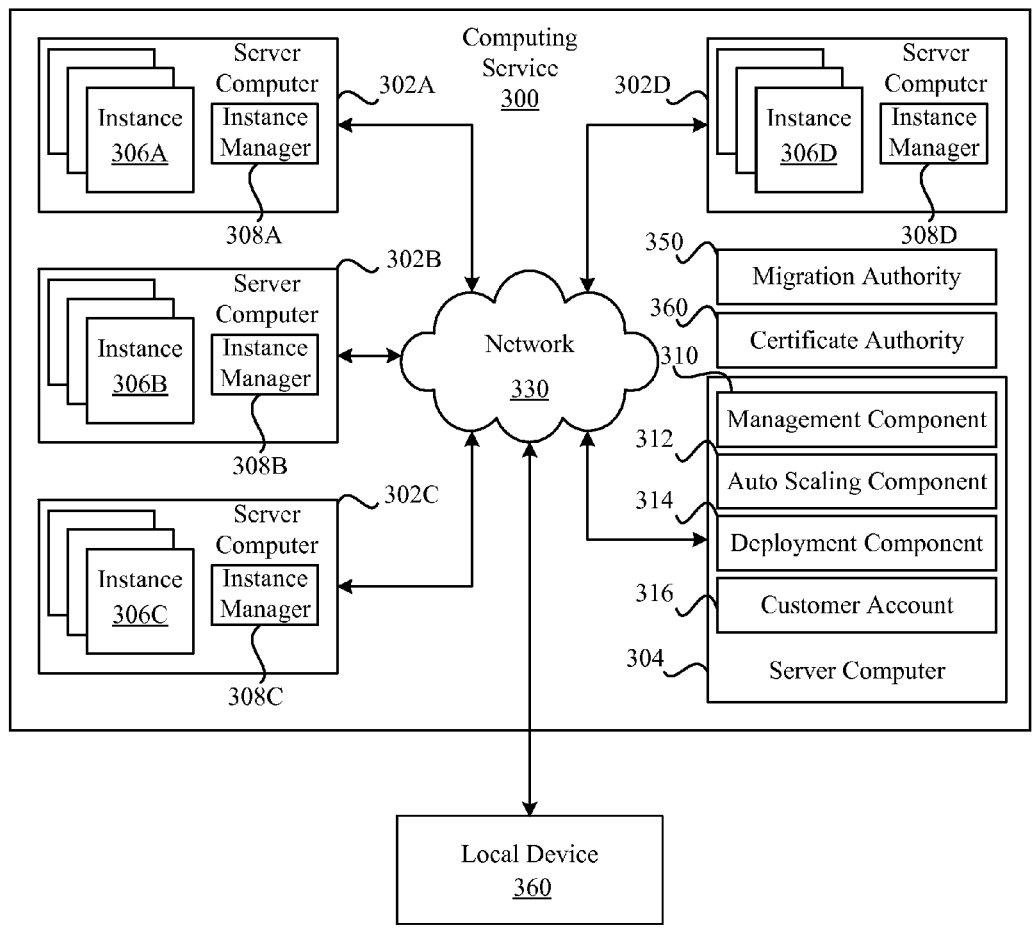
FIG. 3 is a schematic overview of a computing service provider in accordance with an example of the present technology.

FIG. 3 illustrates an example of how components of a data center may function as a computing service 300 in a service provider environment and use this technology for migrating computing instances. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances. In one example, any host that hosts any hosted entity, hosted nodes or hosted objects (e.g., execution environment or storage) may migrate a hosted entity (e.g., computing instance) to another host. Because hosting environments may be nested, the present technology may be applied at any suitable nested level. For example, the technology may be used in migrating an executing script from one script host to another script host. As another example, an application executing on a Java Virtual Machine (JVM) may be migrated to another JVM. The technology may thus be used to migrate any hosted entity between hosts.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A migration authority 350 may be utilized to: migrate a computing instance from one host to another within a service provider environment or between service provider environments. The migration authority 350 may operate as a trusted authority for migrations to implement a three way handshake to initiate transactions and establish a direct connection between hosts for performing the migration, as has been and will be further described. Another trusted authority may be a certificate authority 360. The certificate authority 360 validates the ownership of keys by subjects and certifies this ownership in the form or a public key certificate. The certificate authority 360 may include a repository for certificates and public keys for entities involved in the migration of a computing instance. The certificate authority 360 may validate keys or certificates presented by the entities involved in the migration.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
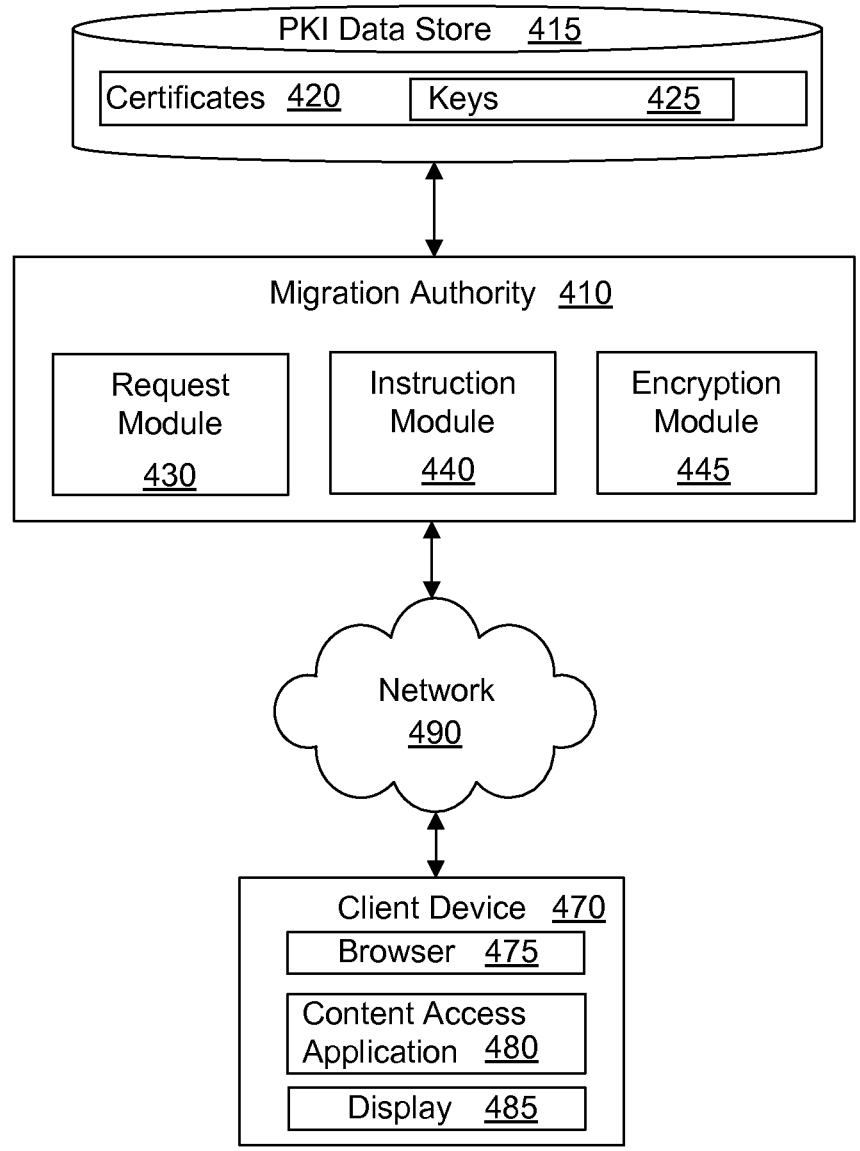
FIG. 4 is a block diagram of a system for migrating computing instances in accordance with an example of the present technology.

Referring now to FIG. 4, a block diagram of a migration authority 410 for migrating computing instances from one host to another is illustrated in accordance with an example of the present technology. The migration authority 410 may be implemented using one or more computing devices in a service provider environment, such as a server as an example computing device, as well as client devices 470, and may be accessed across a network 490. The migration authority 410 may include or be in communication with a data store 415 and a number of modules 430, 440, 445 for storing and processing data to be used in the migration.

An administrator may access and manage one or more computing instances and/or hosts in the service provider environment over a network 490 connection, such as a connection through the Internet, for example. The administrator may perform various operations on the computing instances or hosts such as adding, updating, modifying, deleting or otherwise maintaining instances or hosts, including operations such as migrating computing instances between hosts (e.g., by live migration or otherwise). These operations may be performed by the administrator from the client device 470.

The server(s) may be a computing instance as previously explained, and the computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which computing instances may be created. In other words, the computing instances may execute on the hardware layer by using the platform provided by the virtualization layer. This computing service architecture that supports computing instances is illustrated in more detail in FIG. 3.

The migration authority 410 may include a request module 430. The request module 430 may be configured to receive requests from client device 470 to migrate a computing instance between hosts. The request module 430 may also be configured to send requests to hosts to initiate the sending or receiving of a computing instance selected for migration.

The migration authority 410 may include an instruction module 440. The instruction module 440 may be configured to provide instructions to include in requests sent to hosts to initiate the sending or receiving of the computing instance (and the computing instance data) selected for migration.

For example, the instructions may include an identification of a host to receive a computing instance, an identification of a host to send the computing instance, a public key for another host involved in the migration, a key derivation function for deriving keys for encrypting the migration and so forth.

The migration authority 410 may include an encryption module 445. The encryption module 445 may be configured to apply specific key derivation functions for use by the hosts in deriving keys, as has been described previously. The key derivation functions may also be transaction specific. Also, the encryption module 445 may be configured to encrypt communications sent to the hosts (e.g., using a public key of the hosts).

The migration authority 410 may have access to one or more data stores. For example, the data store may be a PKI data store 415 which may include a certificates data store 420 and/or a keys data store 425. The certificates data store 415 may store a certificate for the migration authority 410, and may store public certificates for the hosts for use in generating host-specific key derivation functions. The public certificates may include the public keys for the hosts. The keys data store 425 may store public for the migration authority 410 as well as the hosts. The migration authority 410 and/or the hosts may optionally further include a cache for temporarily, locally storing certificates or keys for use in a migration operation.

Client devices 470 may access data, content pages, services of the migration authority 410 and so forth via a computing instance or server in a computing service provider environment or one or more computing instances or clusters, over a network 490. Example client devices 470 may include, but are not limited to, a desktop computer, a laptop, a tablet, a mobile device, a television, a cell phone, a smart phone, a hand held messaging device, a personal data assistant, an electronic book reader, heads up display (HUD), or any device with a display 485 that may receive and present the message content.

The system may be implemented across one or more computing device(s) connected via a network 490. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may be a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content, such as auditing information, served up by the computing device and/or other servers. The content access application 480 may be executed to obtain and render for display auditing information from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module.

Such APIs may also allow third parties to interface with the module and make requests and receive output from the modules.

Figure 5:
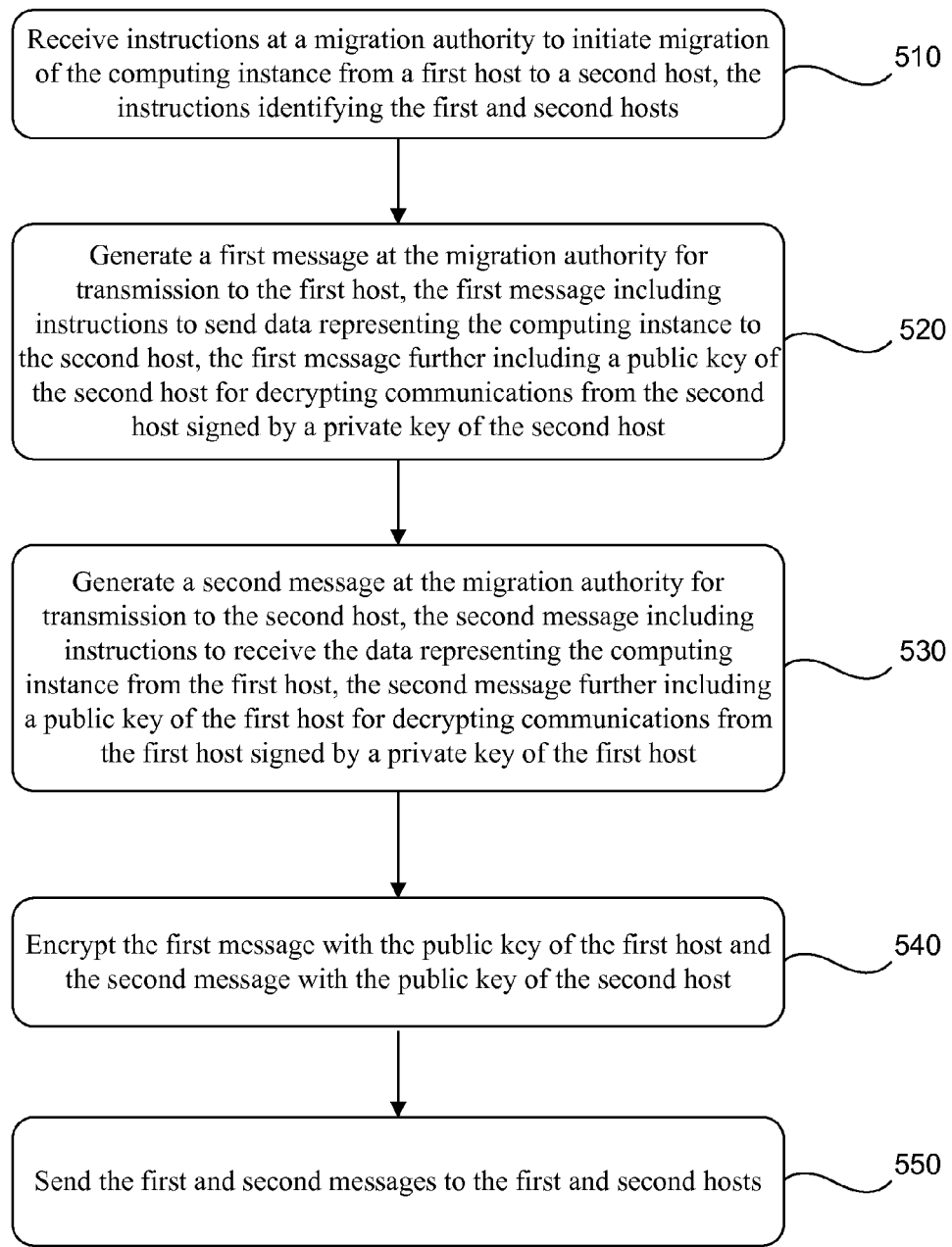
FIGS. 5-7 are flow diagrams for methods of migrating computing instances in accordance with examples of the present technology.
Figure 6:
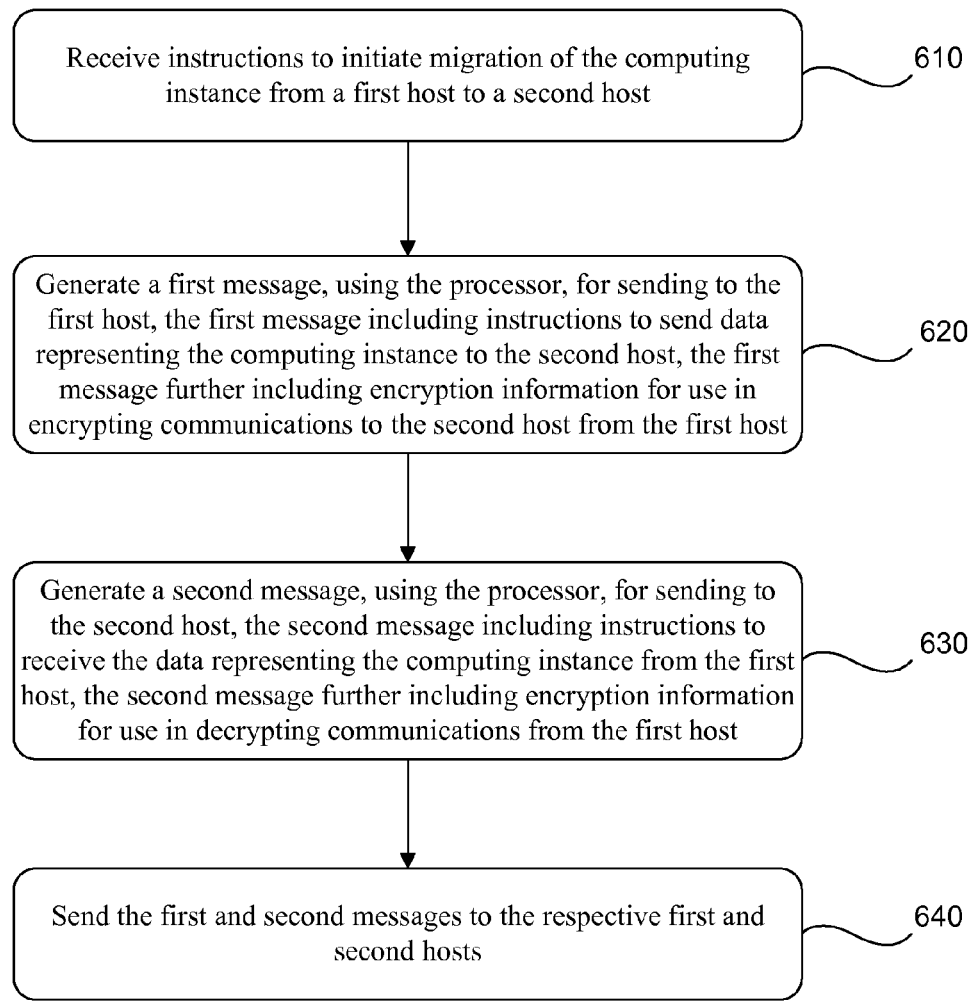
Figure 7:
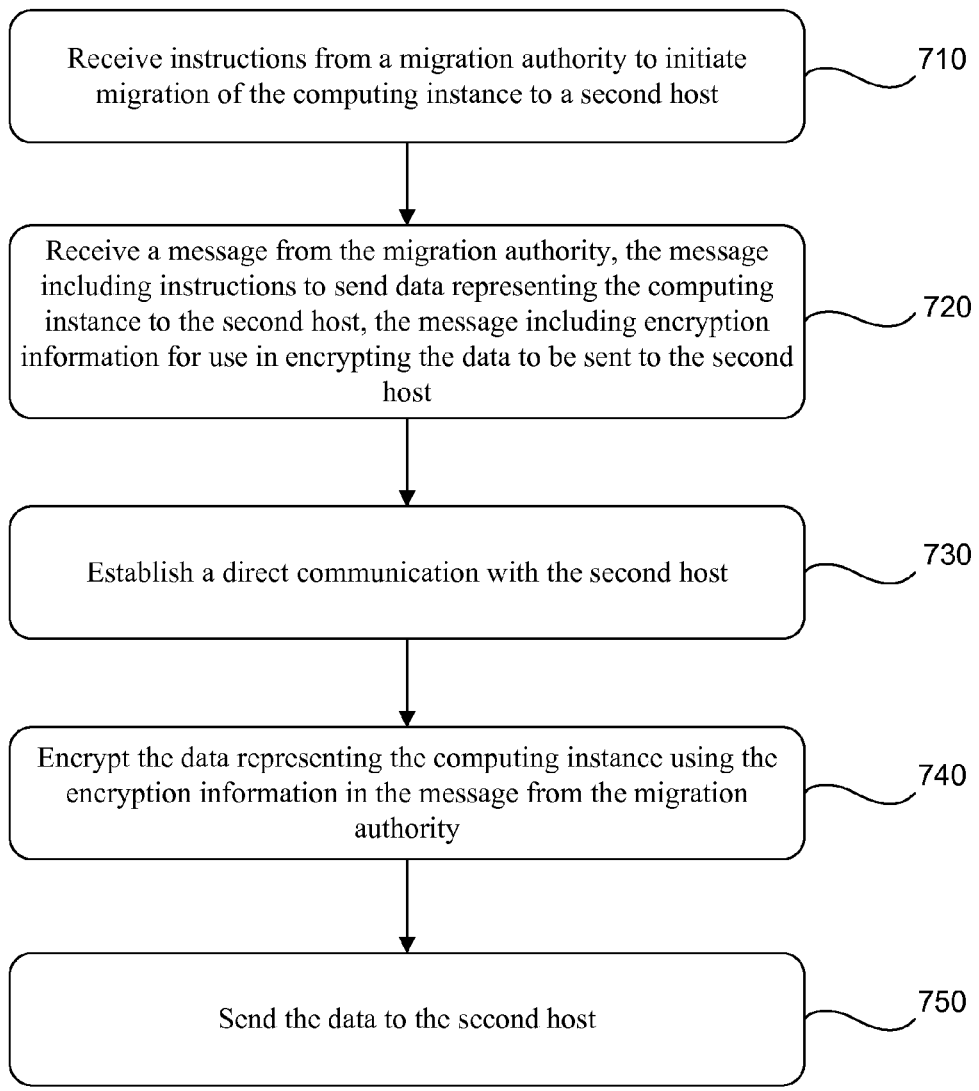

FIGS. 5-7 illustrate flow diagrams of methods or operations for performing the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of example operations for performing the present technology is illustrated for migrating a computing instance. The operations may include receiving 510 instructions at a migration authority to initiate migration of the computing instance from a first host to a second host. The instructions may include an identification of the first and second hosts. A first message or payload may be generated 520 at the migration authority for transmission to the first host. The first message may include instructions to send data representing the computing instance to the second host, and may further include a public key of the second host for decrypting communications from the second host signed by a private key of the second host. A second message or payload may be generated 530 at the migration authority for transmission to the second host. The second message may include instructions to receive the data representing the computing instance from the first host, and may further include a public key of the first host for decrypting communications from the first host signed by a private key of the first host. The operations may include encrypting 540 the first message with the public key of the first host and the second message with the public key of the second host. The operations may also include signing the first and second messages with a migration authority public certificate for verification by the first and second hosts. The operations may include sending 550 the first and second messages to the respective first and second hosts.

The first and second messages may further include a nonce for use in generating a symmetric key for encrypting and decrypting the data representing the computing instance sent between the first and second hosts. The nonce may be used in combination with the first and second hosts' public and private keys to encrypt and decrypt the data representing the computing instance. The first message may further instruct the first host to encrypt the data at a transport layer and the second message may further instruct the second host to decrypt the data at a transport layer. For example, the first message may instruct the first host to individually and separately encrypt each message (or portions) of the data to the second host with a different key and the second message may instruct the second host to individually and separately decrypt each message of the data from the first host with a different key corresponding to the keys used by the first host to encrypt the messages.

In some examples, this or other methods or operations described herein may be implemented wholly or partially as computer readable program code executed by a processor and the computer readable code may be embodied on a non-transitory computer usable medium.

Referring now to FIG. 6, a flow diagram of a method is illustrated for migrating a computing instance. The method may include receiving 610 instructions to initiate migration of the computing instance from a first host to a second host. A first message for sending to the first host may be generated 620 which includes instructions to send data representing the computing instance to the second host. The first message may further include encryption information for use in encrypting communications to the second host from the first host. A second message for sending to the second host may be generated 630 which includes instructions to receive the data representing the computing instance from the first host. The second message may further include information for use in decrypting communications from the first host. The first and second messages may be sent 640 to the respective first and second hosts. The first and second messages may be generated by and sent from a migration authority configured to authorize and orchestrate the migration of the computing instance between hosts.

In one example, the first and second messages may include a nonce for use in deriving keys for encrypting and decrypting the data according to a key derivation function known at and common to the first and second hosts. Sending the first and second messages may include signing and encrypting the first and second messages and sending the first and second messages independently of one another.

In one example, the method may include instructing the first host to use the nonce in combination with a second host public key to encrypt the data, the combination including a concatenation of the second host public key with the nonce and a time stamp. The method may also include instructing the second host to use the nonce in combination with a first host public key to decrypt the data, the combination including a concatenation of the first host public key with the nonce and a time stamp.

The first message may include instructions to use the nonce in a key derivation sequence to generate a series of unique keys for individually and separately encrypting each message of the data at the first host. Similarly, the second message may include instructions to use the nonce to generate a series of unique keys for individually and separately decrypting each message of the data from the first host at the second host.

In one example, the encryption information for use in encrypting communications to the second host from the first host included in the first message comprises a nonce. Additionally, the encryption information for use in decrypting communications from the first host may also comprise the nonce. The first message may optionally include a public key of the second host and the second message may optionally include a public key of the first host. These public keys of the first and second hosts may be public keys of private-public key pairs for use with symmetric key cryptography.

In one example, the method may include instructing the first host to send to the second host. The method may also include instructing the second host to receive from the first host. To ensure a level of security, the first and second hosts may also be instructed to refrain from sending or receiving the computing instance data for the migration in the absence of instructions from a migration authority to do so.

Referring now to FIG. 7, a flow diagram of a method is illustrated for causing migration of a computing instance. The method may include receiving 710 instructions from a migration authority to initiate migration of the computing instance to a second host. A message may be received 720 from the migration authority. The message may include instructions to send data representing the computing instance to the second host. The message may further include encryption information for use in encrypting the data to be sent to the second host. For example, the encryption information may be an encryption key, an encryption seed, a key derivation function, or the like, as has been described previously. The method may include establishing 730 a direct communication with the second host. The data representing the computing instance may be encrypted 740 using the encryption information in the message from the migration authority. The (encrypted) data may then be sent 750 to the second host.

In one example, the encryption information for use in encrypting communications to the second host included in the message includes an idempotent nonce and a public key of the second host. In this example, the method may include concatenating the public key of the second host with the idempotent nonce and a time stamp. The method may further include performing a key derivation sequence to generate a series of unique keys for individually and separately encrypting each message of the data before sending to the second host.

In one example, the method may include deriving a key for encrypting the data using the encryption information in the message in combination with information available prior to receipt of instructions to migrate the computing instance. For example, the encryption information in the message may be a key derivation function and the information available prior to receipt of instructions to migrate may be a certificate of the host.

The method may include refusing requests to migrate the computing instance from sources other than the migration authority. The method may include migrating the computing instance when requests to migrate originate from the migration authority.

Figure 8:
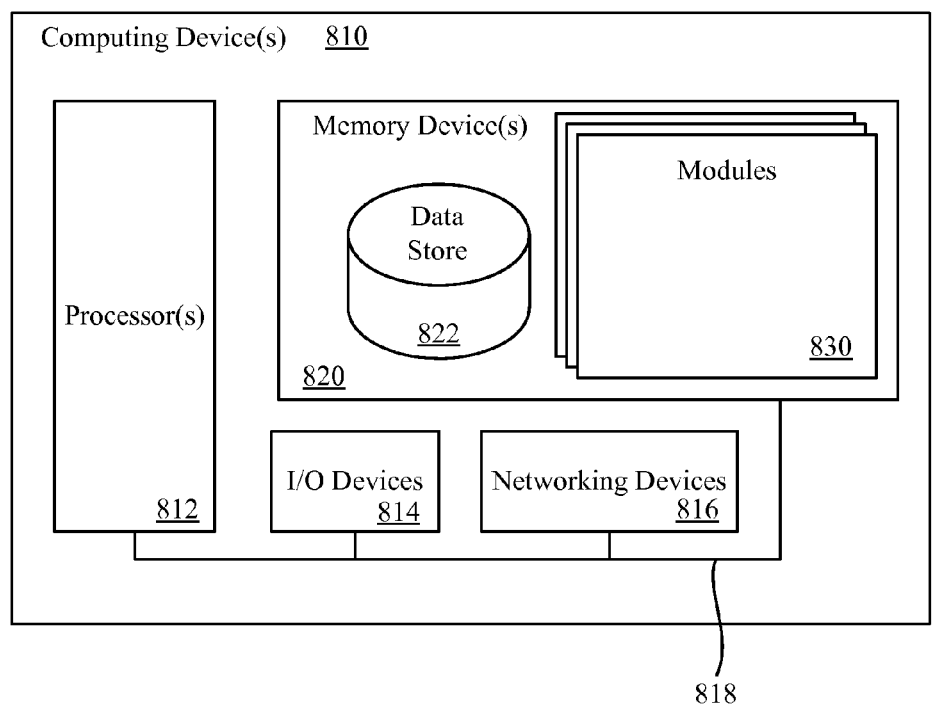
FIG. 8 is a block diagram of a computing system for migrating computing instances in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 830 that are executable by the processor(s) and data for the modules. A data store 822 may also be located in the memory device 820 for storing data related to the modules and other applications along with an operating system that is executable by the processor(s) 812.

The computing device 810 may further include or be in communication with a client device, which may include a display device. The client device may be available for an administrator to use in interfacing with the computing device 810, such as to review operation of a virtual computing instance, make improvements to machine learning models and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing device for secured migration of a computing instance, comprising:
    a processor;
    a memory in electronic communication with the processor;
    instructions stored in the memory, the instructions being executable by the processor to:
    receive instructions at a migration authority to initiate migration of the computing instance from a first host to a second host, the instructions identifying the first and second hosts;

generate a first message at the migration authority for transmission to the first host, the first message including instructions to send data representing the computing instance to the second host, the first message further including a nonce and a derivation function for deriving at least one key for encrypting communications from the first host to the second host;

generate a second message at the migration authority for transmission to the second host, the second message including instructions to receive the data representing the computing instance from the first host, the second message further including a nonce and a derivation function for deriving at least one key for decrypting communications from the first host to the second host;

encrypt the first message with a public key of the first host and the second message with a public key of the second host; and send the first and second messages to the first and second hosts to complete a three-way handshake between the first host, the second host, and the migration authority wherein the three-way handshake is configured to initiate transactions and establish a connection between the first host and the second host.

2. The computing device of claim 1, wherein the instructions included in the first and second messages further instruct the first and second hosts to use the nonce in generating a symmetric key for encrypting and decrypting the data representing the computing instance to be sent between the first and second hosts.

3. The computing device of claim 1, wherein the derivation function uses the nonce in combination with one or more identifiers associated with the first or second hosts to generate public and private keys to encrypt and decrypt the data representing the computing instance.

4. The computing device of claim 1, wherein the first message further instructs the first host to encrypt the data at a transport layer.

5. The computing device of claim 1, wherein the first message further instructs the first host to individually and separately encrypt each message of the data to be sent to the second host with a different key as derived using the derivation function and the nonce.

6. A computer implemented method for migration of a computing instance using a processor of the computer, the method comprising:

identifying instructions to initiate migration of the computing instance from a first host to a second host;

generating a first message, using the processor, for sending to the first host, the first message including instructions to send data representing the computing instance to the second host, the first message further including encryption information for use by the first host in deriving at least one key for encrypting communications to the second host from the first host wherein the encryption information comprises a nonce and a derivation function;

generating a second message, using the processor, for sending to the second host, the second message including instructions to receive the data representing the computing instance from the first host, the second message further including encryption information for use by the second host in deriving at least one key for decrypting communications from the first host wherein the encryption information comprises a nonce and a derivation function;

encrypt the first message with a public key of the first host and the second message with a public key of the second host; and sending the first and second messages to the respective first and second hosts to complete a three-way handshake between the first host, the second host, and a migration authority wherein the three-way handshake is configured to initiate transactions and establish a connection between the first host and the second host.

7. The method of claim 6, wherein:

generating the first and second messages further comprises generating the nonce for use in deriving a plurality of keys for encrypting and decrypting the data according to a key derivation function known at and common to the first and second hosts, and sending the first and second messages comprises: signing and encrypting the first and second messages; and sending the first and second messages independently of one another.

8. The method of claim 7, further comprising instructing the first host to use the nonce in combination with an identifier associated with the second host to derive the at least one key to encrypt the data, the combination including a concatenation of the identifier with the nonce and a time stamp.

9. The method of claim 7, further comprising instructing the second host to use the nonce in combination with a first host public key to derive the at least one key to decrypt the data, the combination including a concatenation of the first host public key with the nonce and a time stamp.

10. The method of claim 7, wherein the first message further includes instructions to use the nonce in a key derivation sequence to generate a series of unique keys for individually and separately encrypting each message of the data at the first host, and wherein the second message further includes instructions to use the nonce to generate the series of unique keys for individually and separately decrypting each message of the data from the first host at the second host.

11. The method of claim 6, wherein the encryption information for use in encrypting communications to the second host from the first host included in the first message comprises a nonce, and the encryption information for use in decrypting communications from the first host also comprises the nonce.

12. The method of claim 11, wherein the first message further comprises a public key of the second host and the second message further comprises a public key of the first host.

13. The method of claim 12, wherein the public keys of the first and second hosts are public keys of private-public asymmetric key pairs for use in secure exchange of symmetric keys which protect the data representing the computing instance.

14. The method of claim 6, further comprising instructing: the first host to send the data representing the computing instance to the second host; the second host to receive the data representing the computing instance from the first host; and the first and second hosts to refrain from sending or receiving the data representing the computing instance in an absence of instructions from a migration authority, and wherein the instructions from the migration authority are idempotent, non-replayable instructions.

15. A system for migration of a computing instance, comprising:

a first processor and memory with instructions to execute a first host configured to:

receive instructions from a migration authority to initiate migration of the computing instance to a second host;

receive a message from the migration authority, the message including instructions to send data representing the computing instance to the second host, the message including a nonce and a derivation function for use in generating at least one key for encrypting the data to be sent in a communication from the first host to the second host;

establish a communication link with the second host;

encrypt the data representing the computing instance using the at least one key; and send the data to the second host to complete a three-way handshake between the first host, the second host, and the migration authority wherein the three-way handshake is configured to initiate transactions and establish a connection between the first host and the second host; and a second processor and memory with instructions to execute the migration authority configured to:

generate a second message for transmission to the second host, the second message including instructions to receive the data representing the computing instance from the first host, the second message further including the nonce and the derivation function for deriving at least one key for decrypting communications from the first host to the second host.

16. The system of claim 15, wherein the message further comprises a public key certificate of the second host, the public key certificate including a public key.

17. The system of claim 15, wherein the instructions further comprises concatenating an identifier of the second host with the nonce and a time stamp to derive an encryption key for encrypting the data representing the computing instance.

18. The system of claim 17, wherein the instructions further comprises performing a key derivation function to generate a series of unique keys for individually and separately encrypting each message of the data using a key from the series of unique keys before sending each message to the second host.

19. The system of claim 15, wherein the instructions further comprises deriving a key for encrypting the data using the nonce in the message from the migration authority in combination with information available prior to receipt of instructions to migrate the computing instance, wherein a usable key is underivable in the absence of both of the nonce from migration authority and the information available prior to receipt of the message.

20. The system of claim 15, wherein the instructions further comprises refusing requests to migrate the computing instance from sources other than the migration authority.

* * * * *